(12) United States Patent
Troitski

(10) Patent No.: US 6,426,480 B1
(45) Date of Patent: Jul. 30, 2002

(54) METHOD AND LASER SYSTEM FOR PRODUCTION OF HIGH QUALITY SINGLE-LAYER LASER-INDUCED DAMAGE PORTRAITS INSIDE TRANSPARENT MATERIAL

(76) Inventor: Igor Troitski, 853 Arrowhead Trail, Henderson, NV (US) 89015

( * ) Notice: Subject to any disclaimer, the term of this patent is extended or adjusted under 35 U.S.C. 154(b) by 171 days.

(21) Appl. No.: 09/651,076

(22) Filed: Aug. 30, 2000

(51) Int. Cl.$^7$ .............................. B23K 26/00; B44C 5/00
(52) U.S. Cl. .............................. 219/121.68; 219/121.69
(58) Field of Search ...................... 219/121.6, 121.68, 219/121.69, 121.73, 121.75; 264/132, 482; 65/111, DIG. 3

(56) References Cited

U.S. PATENT DOCUMENTS

| | | | |
|---|---|---|---|
| 4,092,518 A | 5/1978 | Merard | |
| 4,843,207 A | 6/1989 | Urbanek | |
| 5,206,496 A | 4/1993 | Clement | |
| 5,392,309 A | 2/1995 | Nishimae et al. | |
| 5,473,475 A | 12/1995 | Sweatt et al. | |
| 5,477,554 A | 12/1995 | Yoshii et al. | |
| 5,506,858 A | 4/1996 | Takenaka et al. | |
| 5,575,936 A | 11/1996 | Goldfarb | |
| 5,637,244 A | 6/1997 | Erokhin | |
| 5,644,589 A | 7/1997 | Anthon | |
| 5,886,318 A | 3/1999 | Vasiliev et al. | |
| 6,087,617 A | 8/2000 | Troitski et al. | |
| 6,322,958 B1 * | 11/2001 | Hayashi ...................... | 430/495 |

FOREIGN PATENT DOCUMENTS

| | | |
|---|---|---|
| EP | 0743 128 A1 | 5/1995 |
| RU | 321422 | 11/1970 |
| RU | 1838163 | 3/1992 |
| RU | 20082288 C1 | 2/1994 |
| RU | WO 96/30219 | 3/1995 |

OTHER PUBLICATIONS

John F. Ready, Effects of high–power laser radiation, Academic Press, New York–London, 1971, pp. 288–293.

* cited by examiner

Primary Examiner—Samuel M. Heinrich

(57) ABSTRACT

Embodiments of methods and systems for producing high quality single-layer laser-induced damage portraits inside a transparent material are disclosed. One or more embodiments of the invention comprise a method and a system for production of an etch point without focal area expansion connected with the focused beam refraction. One or more embodiments of the invention comprise a method and a system for producing single layer laser-induced damage portraits based on generation of small smoothed etch points of determined sizes and on control of their brightness without variation of their determined sizes. According to the invention the sizes of etch points, which can be used for reproduction of single-layer portraits are determined; shades of gray are reproduced by controlling the number of breakdowns and their special configurations inside transparent area corresponding to the etch point; disposition of these breakdown configurations inside an etch point of determined sizes is actualized by using cumulative effects.

12 Claims, 12 Drawing Sheets

METHOD AND LASER SYSTEM FOR PRODUCTION OF HIGH QUALITY SINGLE-LAYER LASER-INDUCED DAMAGE PORTRAITS INSIDE TRANSPARENT MATERIAL

FIELD OF THE INVENTION

The present invention relates to a method and apparatus for producing high quality laser-induced damage images in transparent objects.

BACKGROUND OF THE INVENTION

A number of techniques for creating a variety of patterns on the surface and inside of transparent substrates using pulsed laser radiation are well known.

One publication disclosing such techniques is the Russian invention # 321422 to Agadjanov et. al., published on Nov. 16, 1970 (#140454529-33). The invention concerns a method of manufacturing decorative products inside a transparent material by changing the material structure by laser radiation. As disclosed, by moving a material relative to a focused laser beam, it is possible to create a drawing inside the material.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 4,843,207 to Urbanek et al., discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No. 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He—Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev et al. discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied Control means, coupled to the laser, and positioning means are provided for firing the laser so that a local disruption occurs within the article to form the image within the article.

U.S. Pat. No. 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre-programmed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Pat. No. 5,886,318 to A. Vasiliev and B. Goldfarb discloses a method for laser-assisted image formation in transparent specimens, which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

Russian patent publication RU 20082288 to S. V. Oshemkov discloses a process for laser forming of images in solid media by the way of focusing of laser radiation in a point inside a sample which differs by following: with the aim to save the surface and the volume of the sample before the definite point and creation of three dimensional images, the sample is illuminated with the power density higher than the threshold of volume breakdown and moving the sample relatively to the laser beam in three orthogonal directions.

U.S. Pat. No. 6,087,617 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

U.S. patent application Ser. No. 09/354,236 to Troitski discloses a laser-computer graphic system for generating portrait and 3-D reproductions inside optically transparent material. Accordance to the invention, production of a portrait of the same resolution like a computer image is made by using a multi-layer picture. Points of every layer are arranged so that the distance between adjacent etch points are equal to the minimal distance between etch points that can be provided without the breakage of the material. Every layer is parallel with respect to the portrait plane, and distance between parallel planes is set equal to minimal distance at which the breakage of the material does not occur.

U.S. patent application Ser. No. 09/356,252 to Troitski discloses method and laser system for generating the etch points with improved characteristics inside optically transparent material. According to the invention two laser beams are directed at the same focal point inside transparent material. The first and the second laser beams have energy levels below an energy level sufficient to cause breakdown of the material but combination of their energy levels is greater than breakdown threshold. The first and the second laser beams are directed at the same point in directions generally perpendicular to one another.

U.S. patent application Ser. No. 09/557,306 to Troitski discloses method and laser system for creation of laser-induced damages to produce high quality images. Accordance to the invention, a laser-induced damage is produced by simultaneously generating breakdowns in several separate focused small points inside the transparent material area corresponding to this etch point. Damage brightness is controlled by variation of a number of separate focused small points inside the transparent material area.

U.S. patent application Ser. No. 09/583,454 to Troitski discloses method and laser system controlling breakdown process development and space structure of laser radiation for production of high quality laser-induced damage images. Accordance to the invention, at the beginning an applied laser radiation level just exceeds an energy threshold for creating a plasma condition in the material, and thereafter the energy level of the applied laser radiation is just maintain the plasma condition. Accordance to another method a laser generates a $TEM_{mn}$ radiation. The values of the integers m and n are controlled and determined so as to reproduce particular gray shades for a particular point of an image.

U.S. Pat. No. 5,392,309 to Nishimae et al. describes a laser apparatus, which can provide a completely circular laser beam by providing a laser beam, which is symmetrical with respect to an unstable direction. A laser apparatus includes an unstable resonator having a total. reflection mirror and a take-out mirror, and further includes shading means for shading a disturbed phase portion of a laser beam so as to derive exclusively a light having a uniform phase by shading the disturbed phase portion of the beam emitted from the resonator or the beam in the resonator.

U.S. Pat. No. 5,473,475 to Sweatt et al. discloses a method for changing the cross section of a laser beam. The invention is directed to a laser beam reshaping system comprising a mirror having a laser beam reflective surface for converting an incident laser beam having a circular cross-section to a beam having a polygonal cross-section.

U.S. Pat. No. 5,477,554 to Yoshii et al. describes a phase shift device and laser apparatus utilizing the same. The device divides a passing area of a laser beam into plural area and provides the laser beam passing through the plural areas with predetermined phase difference thereby providing a laser beam of a smaller beam spot diameter while maintaining a large depth of focus without change in the numerical aperture of the imaging optical system, and which is adapted to be placed in an appropriate position in the optical path thereby satisfactory correcting the astigmatism of the laser light source, and a laser apparatus employing the phase shift device.

U.S. Pat. No. 5,506,858 to Takenaka et al. describes a laser system with transverse mode selecting output coupler. The laser system includes a stable resonator and a laser medium provided within the resonator, the stable resonator comprising a coupling mirror and a total reflector disposed in an opposed relation to the coupling mirror, the coupling mirror having a partially reflecting portion located centrally and an anti-reflecting portion located around the partially reflecting portion.

U.S. Pat. No. 5,644,589 to Anthon describes two solid state laser structures which are optimized for multimode operation. The first laser structure has a plurality of normal incidence optically transmissive surfaces in the laser cavity. The most reflective one of those normal incidence surfaces is disposed at the optical center of the laser cavity. The gain medium is centered in the sub-cavity defined by a cavity mirror and the optical center. In the second laser structure, there are no normal incidence surfaces in the laser cavity, and the gain medium is disposed at the optical center of the laser cavity.

U.S. Pat. No. 5,745,511 to Leger describes a phase grating and mode-selecting mirror for a laser. The invention teaches how to design and fabricate a custom phase-conjugation mirror, which will accommodate a fundamental-mode beam profile of arbitrary profile in Cartesian x and y transverse dimensions. The invention also teaches how to design and fabricate a diffractive mirror for use as a custom phase-conjugation mirror, which is a mirror that will reflect a wave front having arbitrary (i.e., a complex mode profile that is not necessary only real but may have imaginary components) field at the mirror surface. The invention also teaches using an additional phase element in a laser resonator system having a custom phase-conjugation mirror in order to enhance the phase differential between the fundamental mode and higher-order mode wave fronts over and above the result possible with a single CPCM alone.

U.S. Pat. No. 5,982,806 to Yamaguchi et al. discloses a laser beam converter for converting a laser beam with a single high-order transverse mode into a laser beam with a desired intensity distribution and laser resonator for producing a laser beam with a single high-order transverse mode. The laser resonator is provided with a regulating plate of a high-order transverse mode, which is constructed so as to produce a laser beam in a single high-order transverse mode.

Majority of patents mentioned above disclose the production methods of large etch points with strong or smoothed sharp star structure. For production of laser-induced damage images by using corresponding etch points it is necessary to use specific methods. Particularly, U.S. patent application Ser. No. 09/354,236 to Troitski discloses the method for production of a portrait with the same resolution like a computer image by creation of a multi-layer picture. These multilayer portraits are looked like perfect images if they have enough large sizes. But when portrait sizes decline the quality of multi-layers portraits goes down.

For production of a single-layer high quality portrait it is necessary to produce enough small etch points without sharp star structure. In this case it is possible to reproduce portrait of high resolution and to transmit right gray shades using only single-layer. Particularly, enough small etch points without sharp star structure can be produced using methods disclosed in U.S. patent application Ser. No. 09/356,252 (now abandoned) to Troitski, U.S. patent application Ser. No. 09/557,306 to Troitski (now U.S. Pat. No. 6,333,486), and in U.S. patent application Ser. No. 09/583,454 to Troitski. However using the fact that desirable portrait should have only one layer it is possible to create new more low-price but more effective methods and systems for production of small etch points without sharp star structure, which can be used to create single-layer portraits.

The present patent application discloses the method and the system for production of single-layer high quality portraits with reduced sharp star structure inside transparent materials.

SUMMARY OF THE INVENTION

The present invention has its principal task to disclose a method, systems and apparatus for creating single-layer high quality laser-induced damage portraits inside a transparent material.

One or more embodiments of the invention comprise a method and an apparatus for producing etch points with a size reduced along beam direction by using special optics focusing laser radiation without defacement due to refraction of a focused laser beam at a surface of a transparent article.

One or more embodiments of the invention comprise a laser system for producing single-layer portraits by using the cumulative effect without raise of time production creating smaller etch points of smoother sharp star structure.

One or more embodiments of the invention comprise a method for producing single-layer portraits based on generation of small smoothed etch points of determined sizes and on control of their brightness without variation of their final required sizes.

One or more embodiments of the invention comprise a laser etching system producing high quality single-layer laser-induced damage portraits inside transparent material using generation of small smoothed etch points of determined sizes and dynamic control of their brightness without variation of their final required sizes.

Further objects, features, and advantages of the present invention over the prior art will become apparent from the detailed description of the drawings, which follows, when considered with the attached figures.

DETAILED DESCRIPTION OF THE INVENTION

Figure 1:
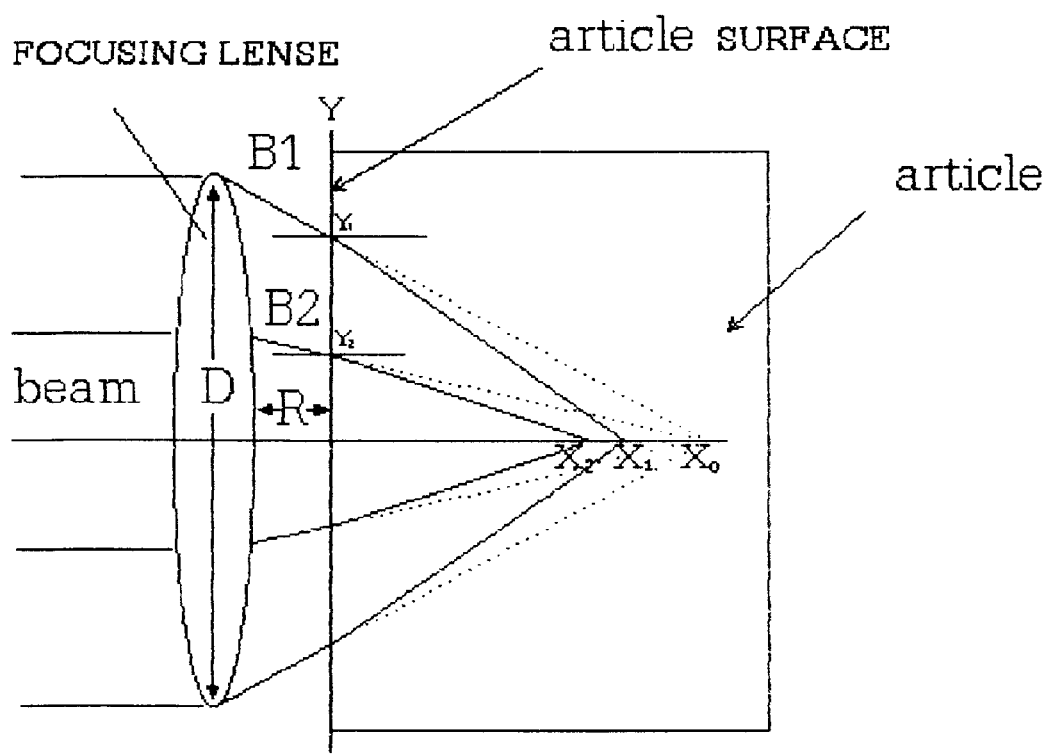
FIG. 1 shows expansion of a focal area along beam direction conditioned by refraction of focused rays at a material surface: D is a lens diameter; R is a lens distance from an article.

The invention comprises a method, systems and apparatus for generating single-layer laser induced-damage portraits inside an optically transparent material. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention relates to methods in which laser energy is utilized to generate visible points or areas of damage inside of an object. Such points may be referred to as "etch" points. Preferably, the object comprises a transparent or substantially transparent object through which may be viewed the created etch points. Such material may comprise glass or similar material.

Multiple of such etch points may be utilized to generate or produce a visible image. The quality of the image is enhanced by generating the points in a variety of different shades. In general, these shades comprise a range of "gray" shades between and including white and black.

Production of a single-layer portrait has four very important particularities:

1. The portrait is produced by etch points equidistant from an article surface and consequently focusing depth of laser radiation is not modified during production.
2. All etch points are placed on the same layer and consequently none point shades others when directions of laser beams are perpendicular to the image plane.
3. Laser radiation can be focused at all predetermined points from two reverse directions.
4. Usually a spectator reviews a portrait approximately at right angles to image plane.

Therefore a visible damage area of a single-layer portrait is determined by its transversal sizes but not its size along beam direction. Consequently, for production of high quality single layer portraits it is necessary to generate etch points without variation of their transversal sizes.

It is important to note that if the damage has transversal sizes smaller than the minimal sizes it becomes invisible. Moreover for reproduction of gray shades it is necessary to use damages of enough large transversal sizes to have a chance to control their brightness. Sizes of a laser-induced damage are a lot more than focal spot sizes but the damage size along a line is directly proportional to a focal spot size along the same line. Star structure of damage is determined by total energy at the focal area: a star structure declines if total energy of a focal spot grows down. But laser breakdown occurs only if energy density exceeds the breakdown threshold. Consequently it is the right way of star structure diminution is reduction of a focal area. It is clear from above, reduction of transversal sizes are limited for a single-layer portrait, therefore it is necessary to reduce focal area size along the beam direction to the minimal size.

All optical systems for producing laser images inside transparent materials described in patents mentioned above focus laser radiation at pre-determined depth of a work article by changing their distances from the article. These distances are controlled during image production. In this case focused laser radiation is refracted at an article surface that conditions expansion of a focal area along a beam direction. The refraction effect depends on a distance between a lens and a work article and a lens diameter. Reference is now made to FIG. 1, which illustrates expansion of a focal area along a beam direction. We see that instead of the beams B1 and B2 occur at the point $X_0$, the ray B1 passes through the point $X_2$ and the ray B2 passes through the point $X_2$. For example, if an article is a crystal glass (relative refractive index is 1.5), then D=28 mm, R=5 mm, $X_0$=30 mm, $Y_1$=12 mm, $Y_2$=5 mm, then $X_1-X_2$=1.6 mm. Taking into account that transversal sizes of laser-induced damages for production of single-layer portraits should be about 0.05–0.1 mm, elimination of focal area expansion connected with the focused beam refraction is urgent.

Figure 2:
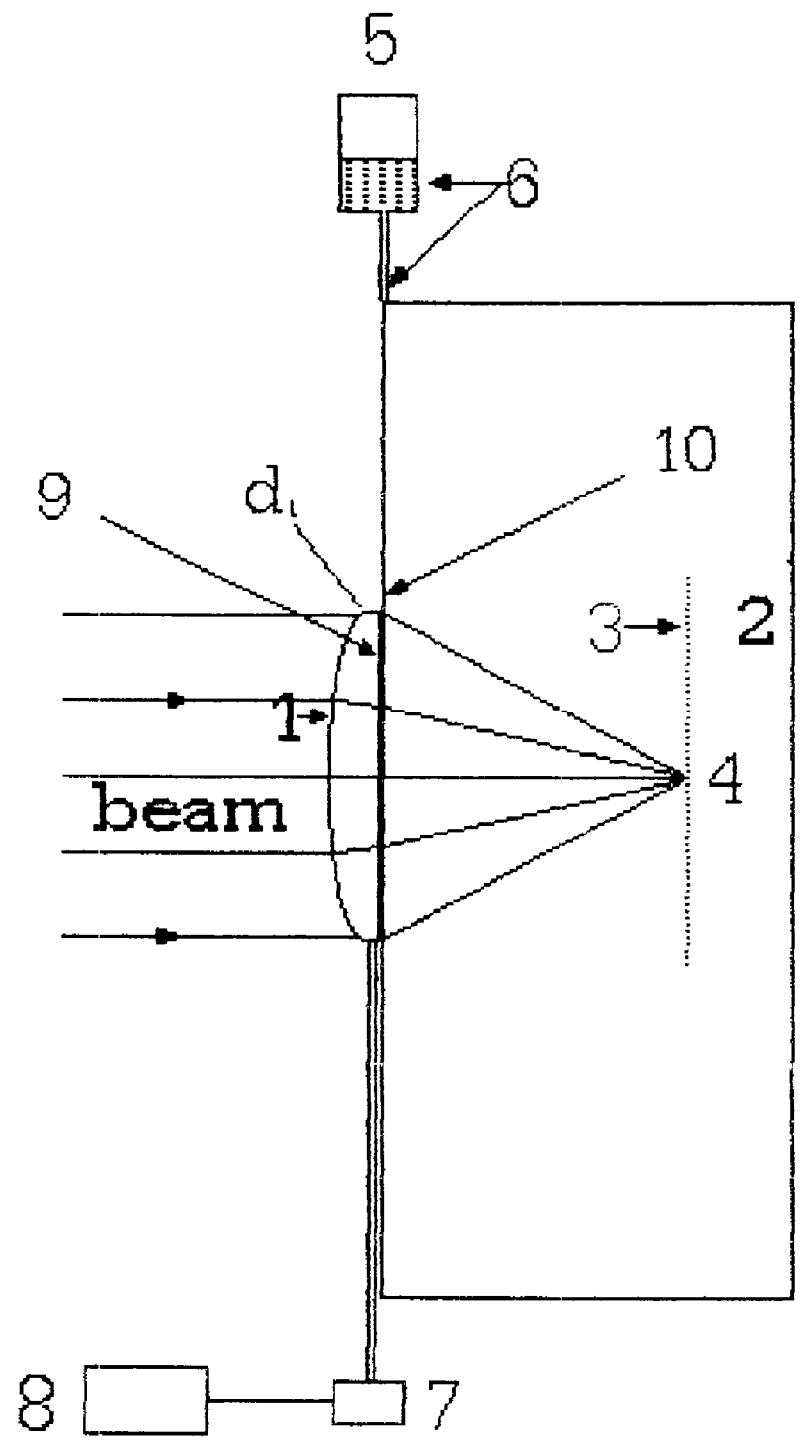
FIG. 2 shows a convex-plane lens focusing of a light beam at the desirable etch point: the lens is made from the material which has the same refractive index value as the transparent sample and its plane slips along the surface of the sample.

One or more embodiments of the present invention are a method for producing a single-layer portrait without focal area expansion connected with the focused beam refraction. A single-layer portrait contains etch points equidistant from a work article surface therefore it is possible to produce the portrait without changing distance of a focusing optic system from an article. FIG. 2 shows focusing of laser radiation by a convex-plane lens 1. The lens is made from the material, which has the same refractive index value as the transparent article 2. The flat face of the lens 9 slips along the flat surface of the article 10. The lens movement is utilized to focus the laser radiation at predetermined point 4 of the specification depth 3 of the article. The depth value of an image plane 3 is determined by the focal length and the lens thickness $d_1$. The drive 7 moves the lens along the flat face of the article. The computer 8 supplies the drive 7 with control signals to provide positioning. A phial 5 comprises liquid optical media of the same refractive index as the lens and the article. This liquid 6 wets the flat faces of the lens 9 and of the article 10 providing optical contact between them.

Figure 3:
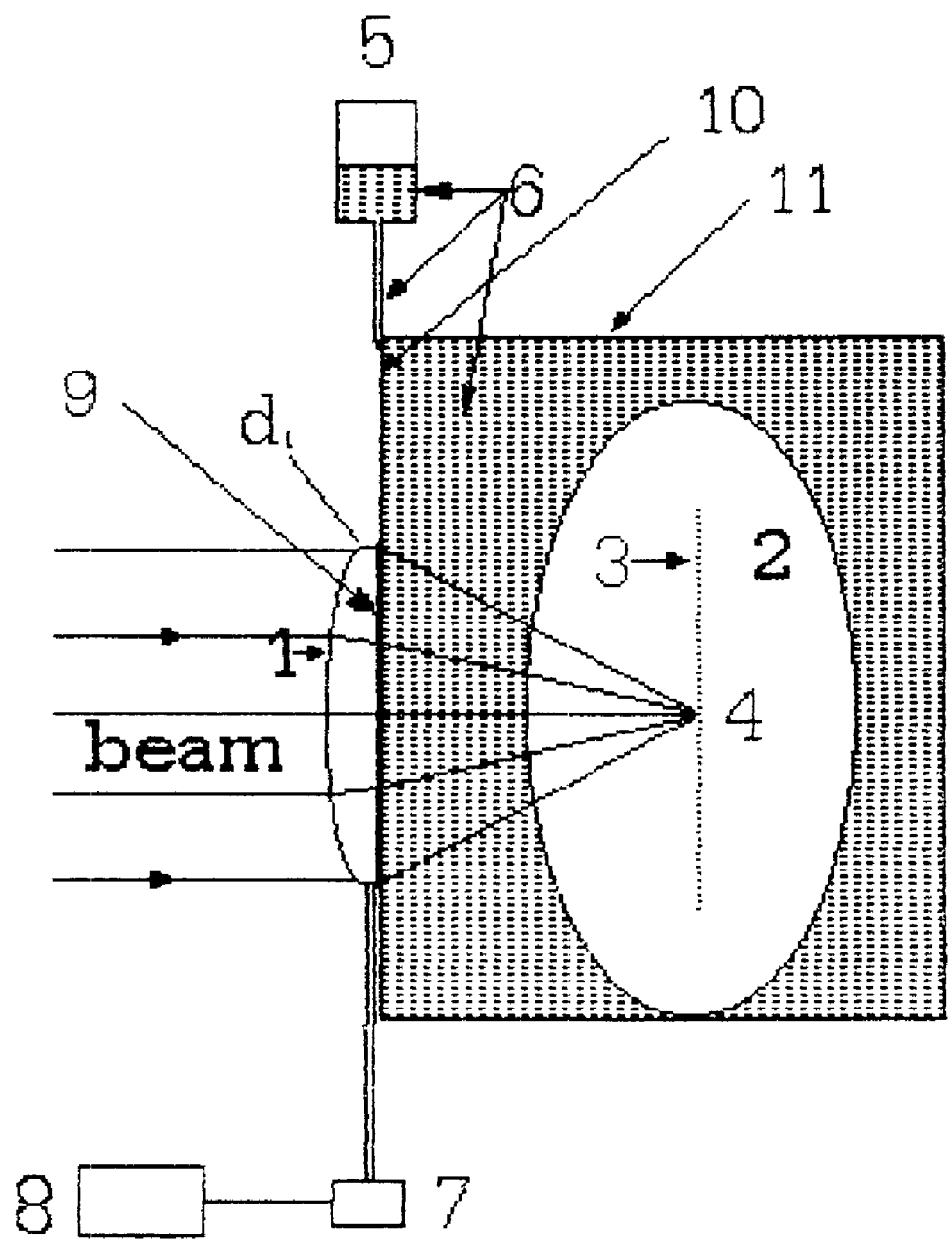
FIG. 3 shows a convex-plane lens focusing of a light beam at the desirable etch point of a transparent material placed inside a container containing liquid optical media of the same refractive index as the lens and the material: the flat face of the convex-plane lens slips along that flat face of the container, which is parallel to an image plane of the article.

Reference is now made to FIG. 3, which illustrates using a convex-plane lens, when the article, in which a single-layer portrait is produced has no flat face. An article 2 is placed inside a container 11 containing liquid optical media 6 of the same refractive index as the lens and the material. The container is made from transparent material of the same refractive index as the lens and the article. The container has flat faces one of which is parallel to an image plane 3 of the article. The flat face 9 of a convex-plane lens 1 slips along that flat face of the container 10, which is parallel to an image plane 3 of the article. The drive 7 moves the lens along the flat face of the article. Laser radiation is focused at predetermined point by the lens. The computer 8 supplies the drive 7 with control signals to provide focusing laser radiation at the pre-determined point. A phial 5 comprises liquid optical media of the same refractive index as the container. This liquid wets the flat faces of the lens 9 and of the container 10 providing optical contact between them.

Figure 4:
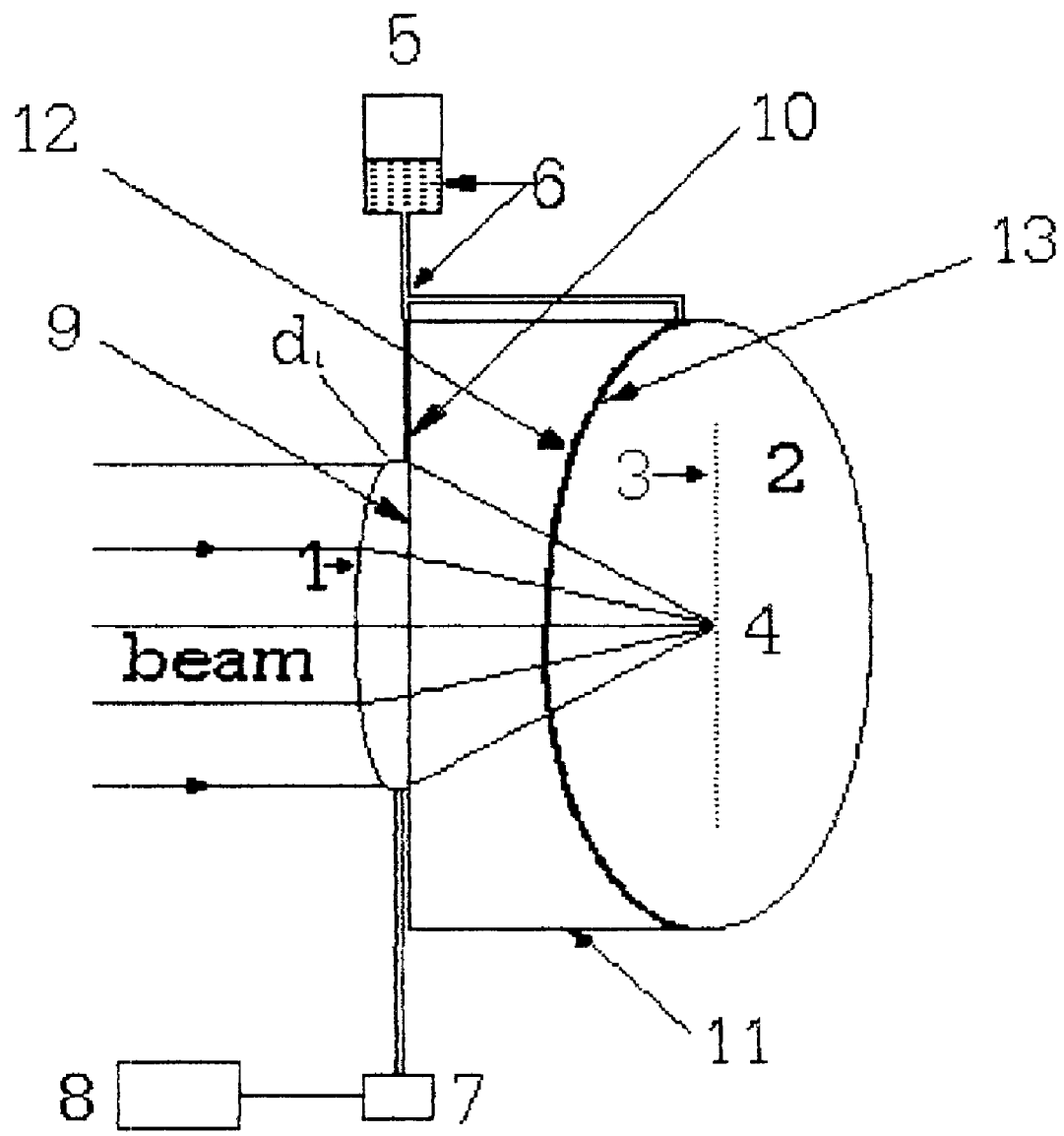
FIG. 4 shows a convex-plane lens focusing of a light beam at the desirable etch point of an article placed inside a sample of "additional" configuration: the lens is moved along the flat face of the "additional" sample and focuses the laser radiation at a point of the specification depth of the article.

FIG. 4 shows another way to use a convex-plane lens, when the article, in which a single-layer portrait is produced has no flat face. If the article has a simple configuration (for example, ellipsoid of revolution) then it is possible to produce the sample of "additional" configuration so that the work article 2 is placed inside the sample 1. The sample 11 should be made from the same material (or from material of the same refractive index) as the work article 2 and should have a flat face 10, which is parallel to an image plane 3. The touching surfaces 13 of the work article 2 and the sample of "additional" configuration 12 are wetted by liquid of the same refractive index as the article and the sample. The lens 1 is moved along the flat face 10 of the "additional" sample 1 and focuses the laser radiation at a point of the specification depth of the article. The drive 7 moves the lens 1. The computer 8 supplies the drive 7 with control signals to provide focusing laser radiation at the pre-determined point of image plane. A phial 5 comprises liquid optical media of the same refractive index as the container. This liquid wets the flat face 9 of the lens 1 and the flat face 10 of the additional sample 11 providing optical contact between them.

As it was mentioned above one of the particularities of single-layer portrait production is all etch points are placed on the same layer and consequently none point shades others when directions of laser beams are perpendicular to the image plane. This gives a chance to use the famous cumulative effect for producing small etch points without increment of time production. "Cumulative effects have been found, particularly for glasses and polymers; that is to say, when the material is irradiated with a number of pulses, each one below the threshold for which damage occurs in a single pulse, the sample may still be damaged after several pulses . . . the damage threshold may drop by a factor of the order of three after the material has been struck with several (approximately four or five) laser shots in succession "(From John. E. Ready, Effects of High-Power Laser Radiation, Academic Press, New York, 1971, page 291). And so, cumulative effect decreases the damage threshold. But decrease of the damage threshold value permits to reduce energy density of a focal area, where breakdown should be occurred. This in turn reduces the transversal sizes of etch points and smoothes their star structure. Consequently using cumulative effect it is possible to produce the etch points of smaller sizes and smoother star structure.

Figure 5:
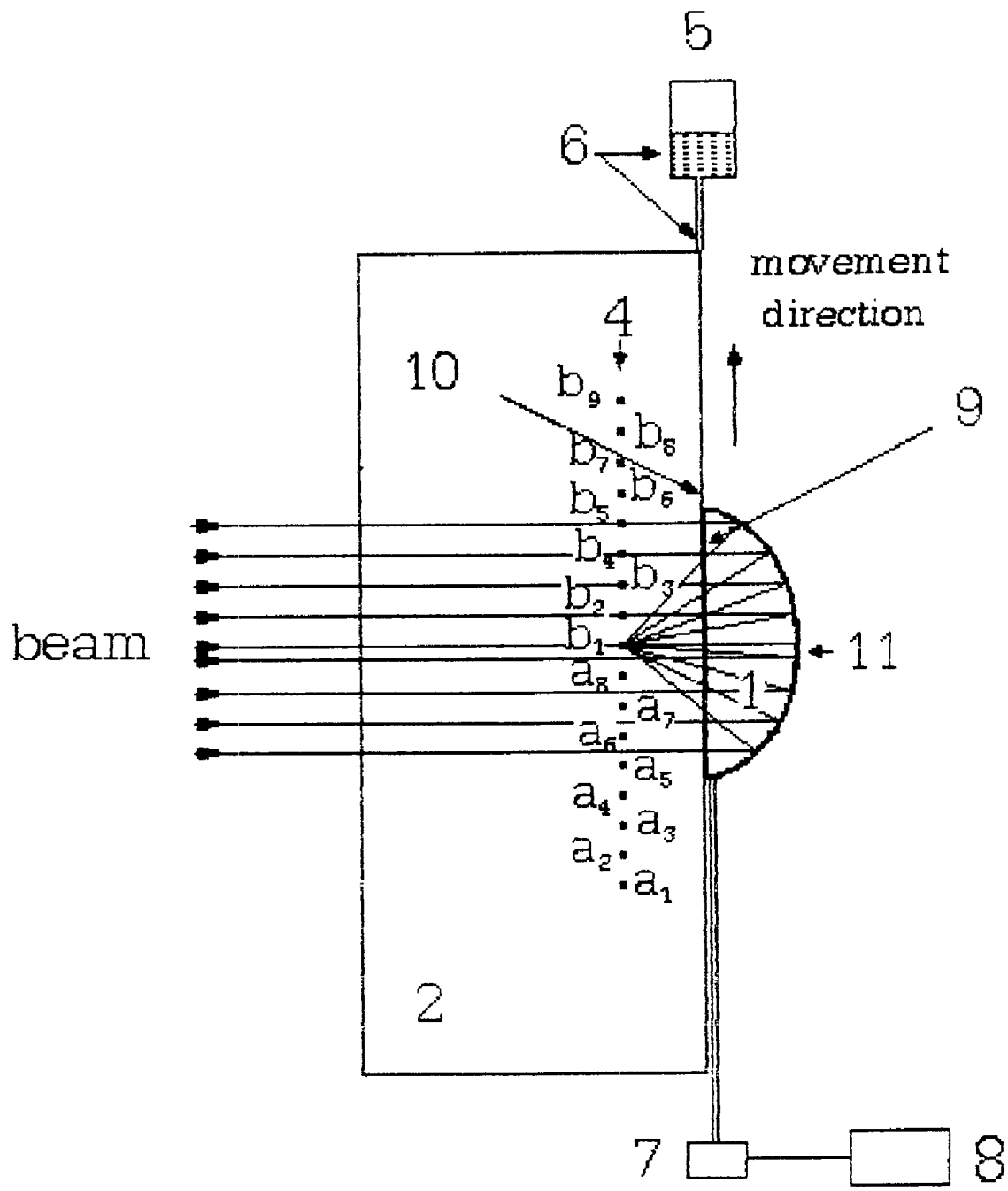
FIG. 5 shows a block-diagram of a laser system using the cumulative effect for single-layer portrait production without time production increment.

Reference is now made to FIG. 5, which shows a way using the cumulative effect for single-layer portrait production without time production increment. A laser beam passes through a work article 2 irradiating several points of an image plane 4, thereafter the beam is focused by the focuser 1 at the pre-determined point $b_1$ of the image plane. The focuser 1 is made from the material of the same refractive index as the article 2. The focuser has one plane surface 9 and the other spherical surface 11, which is covered by a reflecting coating. The focuser 1 is moved along the flat face 10 of the article by the drive 7. The computer 8 supplies the drive 7 with control signals to provide focusing laser radiation at the pre-determined point of image plane. A phial 5 comprises liquid optical media 6 of the same refractive index as the article. This liquid wets the flat face 9 of the focuser land the flat face 10 of the article providing optical contact between them. $A_1 \ldots a_7$ are points of the image plane at which breakdowns have occurred; $b_2 \ldots b_9$ are the points at which breakdowns will occur; $b_2, b_3, b_4$, and $b_5$ are the points, which are irradiated by laser beam for the benefit of cumulative effects. The coating reflectance of the focuser 1 is determined so that the focused energy is rather more than the cumulative threshold.

Though the previous method reforms the sizes of laser-induced damages, but it has one fundamental disadvantage for production single layer portrait: the etch point brightness can be controlled only by variation of damage sizes. A method producing etch points of different brightness without variation of etch point sizes was disclosed in U.S. patent application Ser. No. 09/557,306 to Troitski. But this method has another fundamental disadvantage for production of a single-layer portrait: the etch point sizes can not be made in accordance with demands of high quality single-layer portrait production. The etch point sizes of the method are determined by the number of breakdowns and their configuration, and desirable diminution of the sizes can give an internal split and can erode the damage form.

One or more embodiments of the present invention are a method for producing single-layer laser-induced damage portraits based on generation of small smoothed etch points of determined sizes and on control of their brightness without variation of their final required sizes. The important step of single-layer portrait processing is determination of that maximal size of etch points which else permits to reproduce the portrait with the right spatial resolution. Just these etch points should aggregate the portrait and reproduce right gray shades. The etch point brightness corresponding to determined gray shade is generated by configuration of the right number of breakdowns. Every breakdown creates a small damage. An etch point has smooth shape if distance between the adjacent small damages is not larger than their average size. These average sizes are determined by the damage threshold: smaller threshold value gives a chance to produce smaller damages. But the threshold value is a characteristic of the selected transparent material and can be decreased using cumulative effect. In other words using cumulative effect it is possible to decrease a scale of speckle structure at an etch point. Thereby determined configurations of breakdowns can be placed inside etch point area of required sizes.

A method of single-layer portrait production based on generation of small smoothed etch points of determined sizes and on control of their brightness without variation of their final required sizes, comprises 19 steps:

1. The transparent material in which the portrait should be produced is selected.
2. The maximum linear dimension ($d_m$) of etch points of the material is determined so that a person can not see gaps by naked eye at a block of the etch points located at the distance $d_m$ from each other.
3. The portrait data are supplied to a computer using a digital video camera, a scanner, or any other photoelectric or electromagnetic device that converts the portrait into corresponding electric signal for processing by the computer.
4. The minimum number ($N_m$) of pixels necessary for enough high spatial resolution of the portrait is determined: $N_x$, $N_y$ are the number of pixels along X, Y axes in a coordinate system shown in FIG. 9. (For example, this step can be done using procedure "Resample" of Corel Photo-Paint.)
5. The minimum number (M) of gray shades necessary for enough high quality of the portrait is determined. (For example, this step can be done using procedure "Posterize" of Corel Photo-Paint.)
6. The linear dimensions of the portrait produced inside transparent material are selected: $L_x$ and $L_y$ are linear dimensions of the portrait corresponding X axis and Y axis.
7. The linear dimensions of an etch point ($d_1$) is determined: $d_1$ is equal to max $\{N/L_x, N_y/L_y\}$.
8. The real linear dimension of an etch point (d) is determined: $d=d_m$ if $d_1>d_m$ but $d=d_1$ if $d_1<d_m$.
9. The real number (N) of pixels necessary for reproduction of the portrait is determined: $N=N_m$ if $d=d_m$ but N is equal to the integer part of $N_m d_m/d_1$ if $d=d_1$.

10. The dependence of brightness of an etch point from the number of small points generating the etch point in the material is determined.
11. Using the dependence of step 7 and the minimum number (M) of gray shades (step 3), the numbers of breakdowns $n_1 \ldots n_m$ generating etch points, which are necessary for reproduction of M gray shades are determined.
12. Taking into account that distances between adjacent points, in which breakdowns occur, the average linear dimension ($d_0$) of the laser-induced damages generating an each etch point is determined: $d_0 = d\pi^{1/2}/2(2n_m)^{1/2}$.
13. The dependence of the threshold value from the number of pulses irradiated the material area previously is determined.
14. The dependence of laser-induced damage sizes from the breakdown threshold value is determined.
15. Using the value of do and data of steps 10 and 11 the number of pulses (Z), which should irradiate a material previously are determined.
16. The original portrait is resampled down so that the number of its pixels is equal to 2N and the number of gray shades is equaled to M.
17. The portrait file of step 13 is modified so that all pixels with odd (or even) coordinates along X or Y axes become black.
18. In accordance with step 8, appropriate configuration of laser-induced damages is associated with every pixels of the last portrait file except of its black pixels.
19. Every predetermined area of the material, where an etch point should be created, is irradiated by Z pulses every of which has energy a shade lower than threshold value and after one pulse is focused at the point so that the special configuration of breakdowns occurs at the point.

Figure 9:
FIG. 9 illustrates a portrait supplied to a computer for its production in transparent material.
Figure 10:
FIG. 10 illustrates the portrait of FIG. 9 after reduction of the number of its pixels and gray shades.
Figure 11:
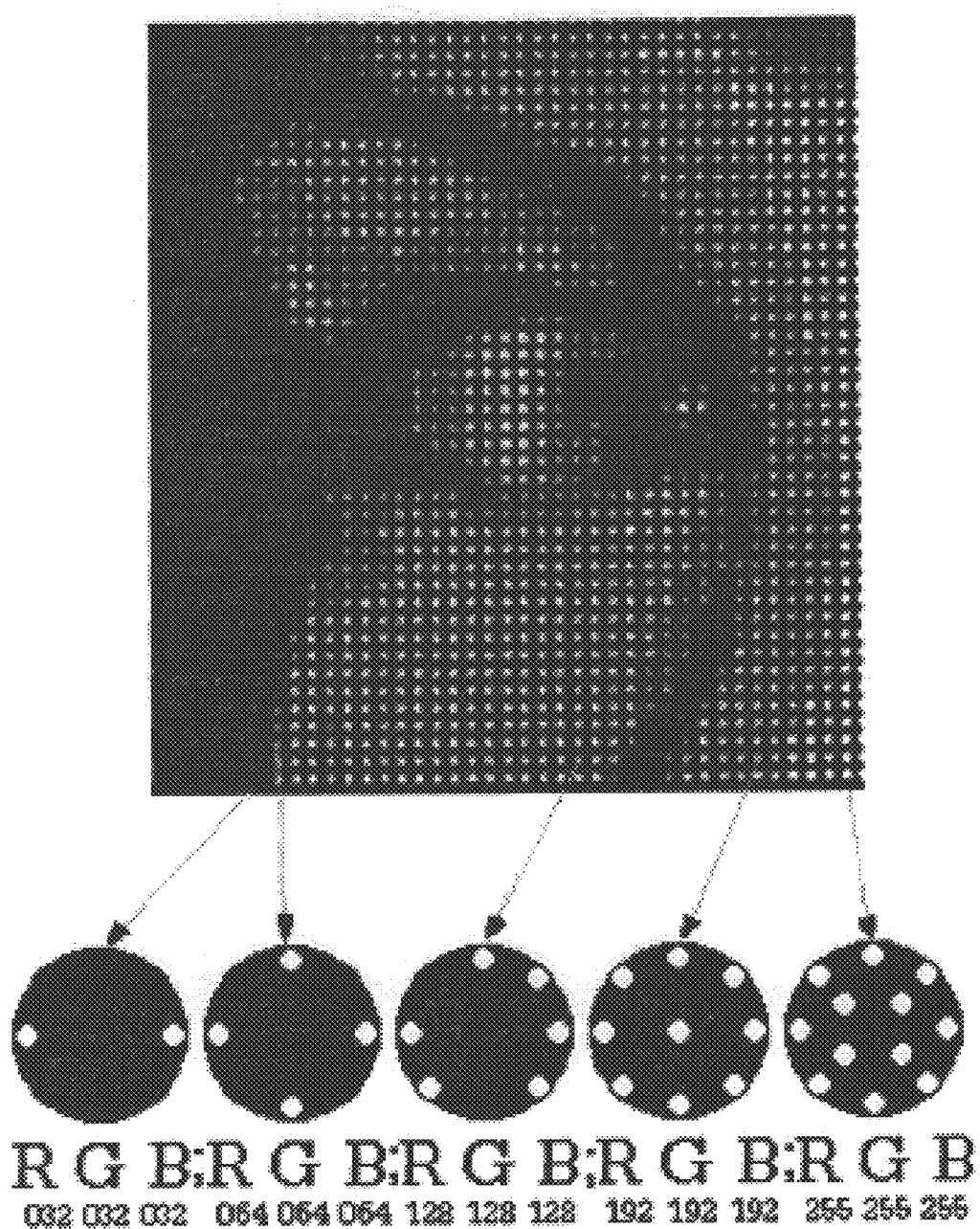
FIG. 11 shows a fragment of the portrait of FIG. 9 after dedication of pixels, which correspond to etch points, which should be produced inside transparent material, and shows configurations of breakdowns to generate etch points with right brightness.

FIG. 9 illustrates a portrait supplied to a computer after step 3. FIG. 10 shows the portrait produced after step 4 and 5: $N_m$=40581, $N_x$=276, $N_y$=285; M=5. RGB of these shades of gray are: 032, 032, 032; 064, 064, 064; 128, 128, 128; 192, 192, 192; 255, 255, 255. FIG. 11 illustrates a fragment of the portrait produced after steps 16 and 17. A pixel of the portrait has integer-valued coordinates so that its X coordinate is its number along X axe and its Y coordinate is its number along Y coordinate. Colors of pixels with odd coordinates along X or Y axes are varied on black color. The pixels of the portrait (except black pixels) correspond to that etch points, which should be produced inside the transparent material. The figure shows also the configurations of breakdowns inside etch point area for reproduction right gray shades of the pixel.

General part of the method is dynamic control of the number of small laser-induced damages and their configuration, which aggregate integrated etch point. U.S. patent application Ser. No. 09/557,306 to Troitski discloses a system using an array of small lens. This system is enough complicate and application of small lens confines the focused beam. Consequently, it makes difficult to produce small laser-induced damages inside that small etch points, which are needed for single-layer portraits. U.S. Pat. No. 5,392,309 to Nishimae et al., U.S. Pat. No. 5,473,475 to Sweatt et al., U.S. Pat. No. 5,477,554 to Yoshii et al., U.S. Pat. No. 5,644,589 to Anthon, U.S. Pat. No. 5,745,511 to Leger and U.S. Pat. No. 5,982,806 to Yamaguchi et al. disclose different techniques for controlling space structure of laser radiation. However, all of them are not efficient for generation of the speckle pattern, which is essential for simultaneously producing breakdowns in several separate focused small points inside the transparent area corresponding to every etch point, moreover they can not be used for dynamic control of the number of small points for every etch point.

Figure 6:
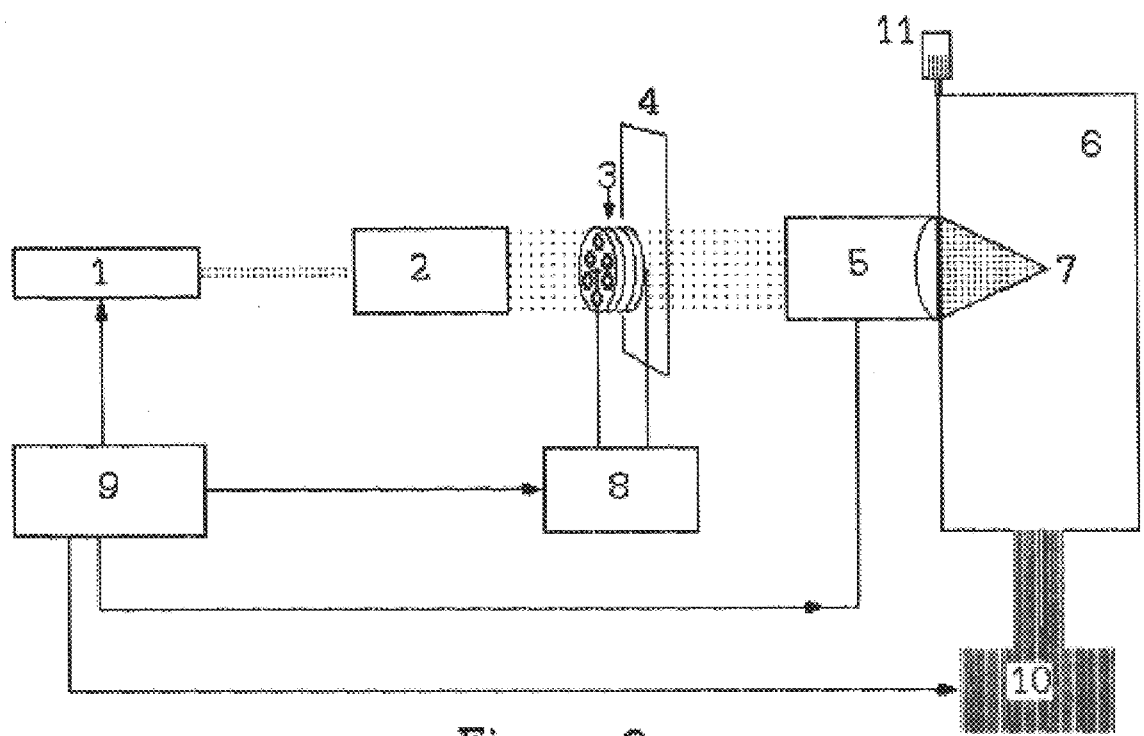
FIG. 6 shows a block-diagram of a laser system of single-layer portrait production by dynamic control of configuration and the number of small points, which aggregate every etch point.

One or more embodiments of the present invention are a method of dynamic control of the number of small points, which aggregate every etch point. Reference is now made to FIG. 6. A laser 1 generates $TEM_{00}$, narrow, intense beam of light. Once emitted from the laser 1, the pulsed beam passes through a beam expander 2 and to a space structure modulator 3 that changes its space structure in accordance with the computer signal. After passing through the space structure modulator 3 the laser beam passes through the optical system 5, which focuses the laser radiation inside the transparent material 6 so as the energy distribution of the focal spot 7 corresponds to the light intensity distribution of the image plane 4. The space structure modulator 3 includes a batch of masks, which can roll relative to their centers independently. The computer 9 supplies the laser 1 and the drive 8 with control signals to provide positioning of every mask for each laser pulse. Thereby each laser pulse generates that number of small points and that their configuration which is necessary for production of every etch point with right gray shade. The computer 9 supplies the optical system 5 with control signals to provide right distances between breakdowns generating an etch point.

Figure 7:
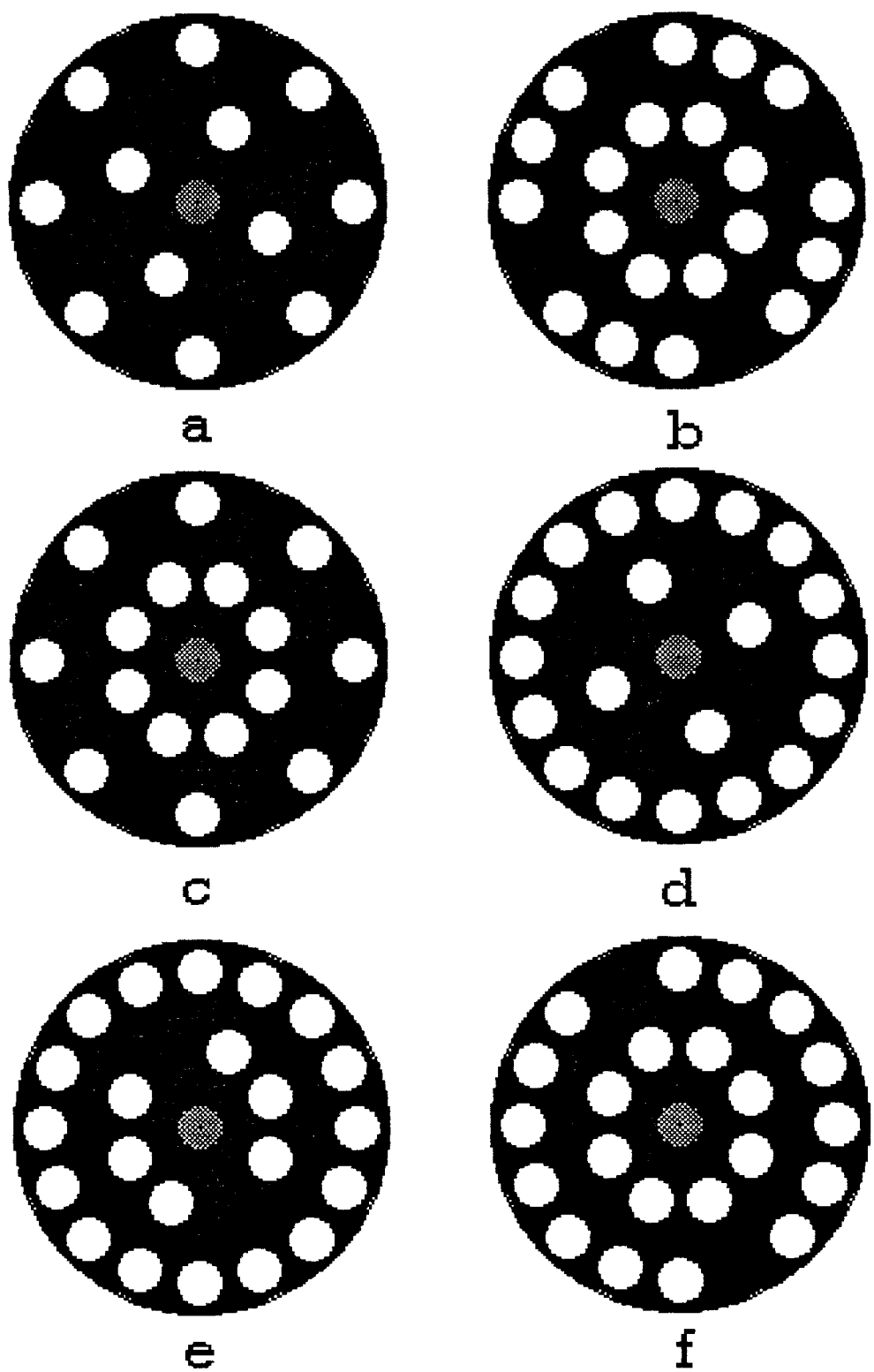
FIG. 7 shows the example of masks, which can be placed into direction of laser beam for creation of several separate focused small points inside the transparent material area corresponding to predetermined etch point.
Figure 8:
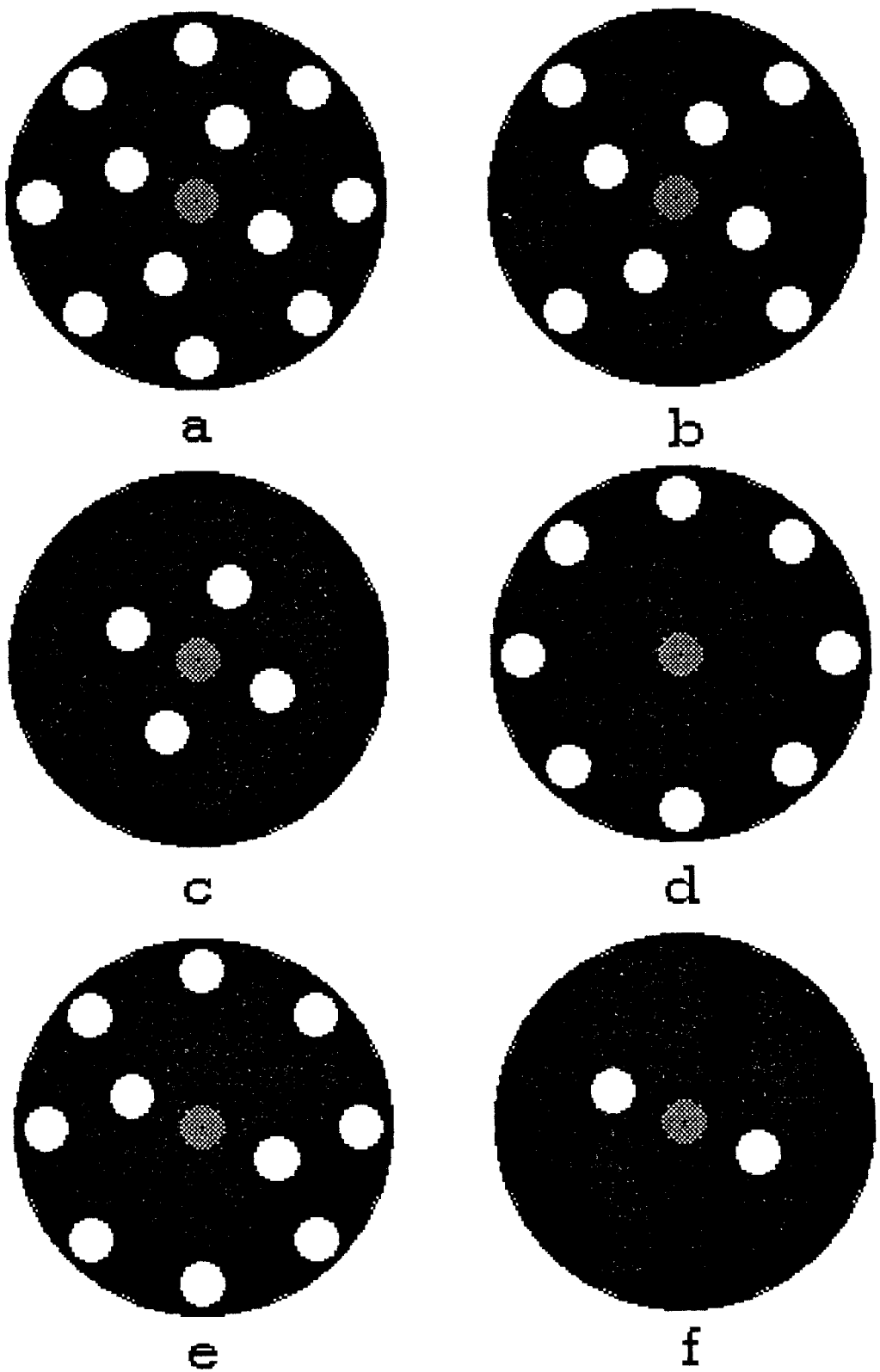
FIG. 8 shows the example of speckle patterns of the image plane coincident with the last mask of the block of masks shown in FIG. 7. Different speckle configurations correspond to varied mutual positions of the masks.

FIGS. 7 shows the example of peephole masks, which can be placed into direction of the laser beam for creation of several separated focused small points inside the transparent material area corresponding to the predetermined etch point. The masks have different configurations of peepholes and are placed one after another so that their centers consist and they roll independently. Light passes only through the parts of the masks, which are marked by the white circles. If all masks of FIG. 6 placed one after another as it shown in the FIG. 6, then 12 bright speckles (configuration of FIG. 8a) are arisen on the plane image 4 and 12 breakdowns generate an etch point. If the mask FIG. 7b is rotated on angle 22.5° then 8 bright speckles (configuration of FIG. 8b) are arisen on the plane image 4 (FIG. 6) and 8 breakdowns generate an etch point. If the mask FIG. 7c is rotated on angle 22.5° then 4 bright speckles (configuration of FIG. 8c) are arisen on the plane image and 4 breakdowns generate an etch point. If extra the mask FIG. 7e is rotated on angle 22.5° then 2 bright speckles (configuration of FIG. 8f) are arisen on the plane image and 2 breakdowns generate an etch point. Similarly, mutual rotation of other masks permits to generate desirable number of bright speckles of right configuration on the plane image 4 (FIG. 6). Since the energy distribution of the focal spot simulates the light intensity distribution of the image plane coincident with the last mask of the mask device, it is possible using the optical system 5 (FIG. 6) to control distances between breakdowns generating an etch points. It is useful to note that the block of masks can form all configurations of peepholes shown in FIG. 11.

Figure 12:
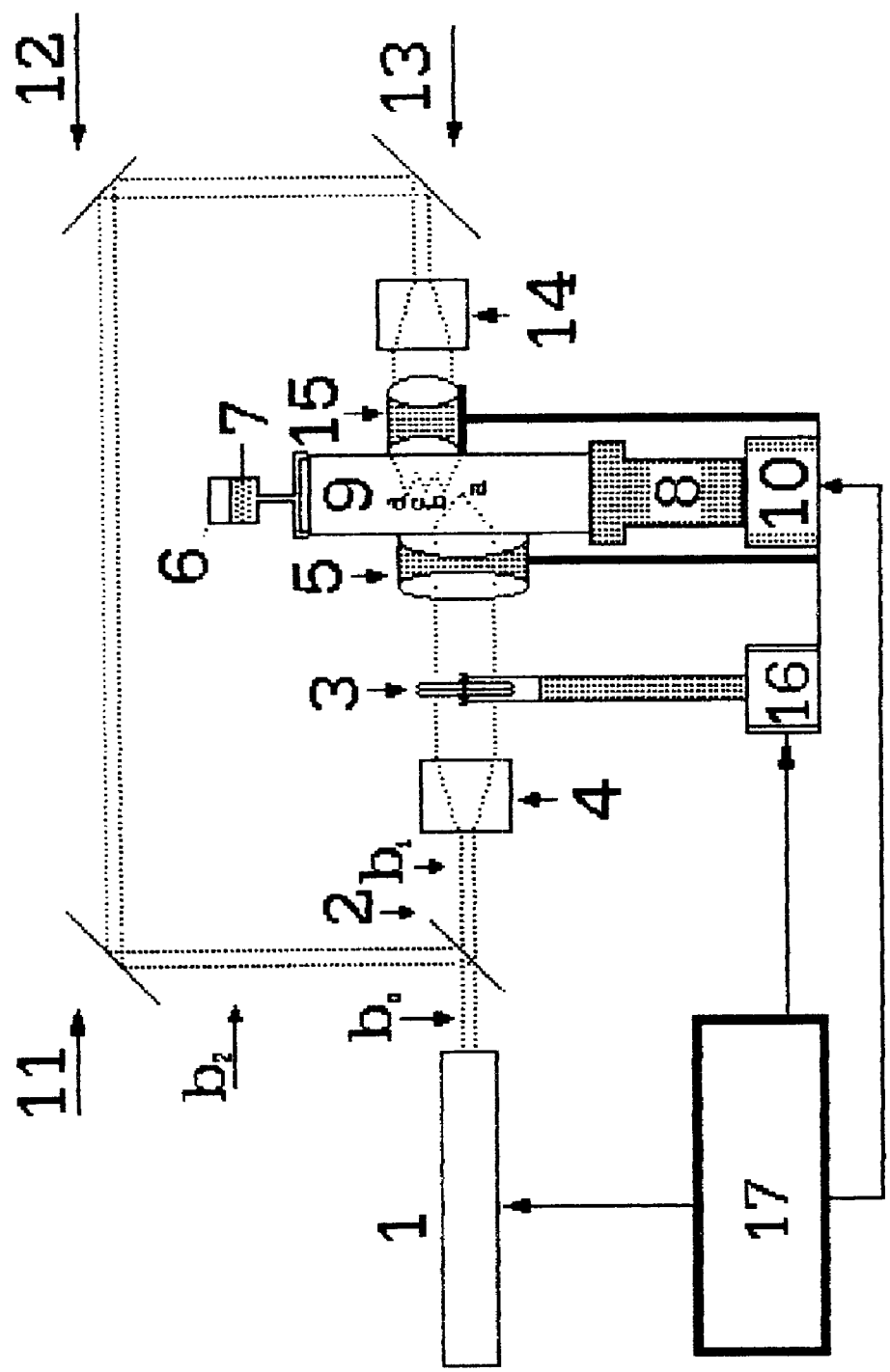
FIG. 12 illustrates in block-diagram form a laser etching system producing high quality single-layer laser-induced damage portraits inside transparent material using generation of small smoothed etch points of determined sizes and dynamic control of their brightness without variation of their final required sizes.

Reference is now made to FIG. 12, which illustrates in block-diagram form a laser etching system producing high quality single-layer laser-induced damage portraits inside transparent material using generation of small smoothed etch points of determined sizes and dynamic control of their brightness without variation of their final required sizes. Once emitted from the laser 1, the pulsed, $TEM_{00}$ beam $b_0$ is divided by a beamsplitter 2 into two separate beams $b_1$ and $b_2$. An energy value of the beam $b_1$ focused at a point of an article 9 is sufficient to create breakdown at the point. An energy value of the beam $b_2$ is lower than the threshold value but being focused is sufficient to provide cumulative effects at determined number of points following for the point "a"

(FIG. 12 shows three such points "b", "c", "d"). The beam $b_1$ passes through a beam expander 4 and the space structure modulator 3 to an optical system 5. The optical system 5 focuses the beam at the predetermined point "a" of the article 9 so that the speckle pattern of the focal plane is corresponding to the beam structure behind the space structure modulator 3. The maximal energy of the speckle pattern is rather more than the damage threshold actualized after cumulative effects. An output lens of the optical system is a convex-plane lens described above. The principal of operation of the space structure modulator was also disclosed above and was illustrated by FIG. 6. The beam $b_2$ is directed to the transfer mirrors 11, 12, 13 that direct it through a beam expander 14 to an optical system 15. The optical system focuses the beam so that it irradiates right number of points following directly for the point "a". In the capacity of the optical system 15 can also be used a cylinder lens, focusing beam $b_2$ along direction of the article movement. The focusing length is so that laser radiation covers the right number of points to provide cumulative effects. The lens is made from the material, which has the same refractive index value as the article 9. The flat face of the lens slips along the back flat surface of the article. A phial 6 comprises liquid optical media of the same refractive index as the lens and the article. This liquid 7 wets the front and back faces of the lenses 5, 15 and of the article 9 providing optical contact between them. The computer 17 controls the laser 1, a driver 16, responsible for formation of the right speckle pattern behind the space structure modulator 3, and table driver 10 providing etch point positions along X, Y axes by moving a table 8.

I claim:

1. A method for producing single-layer laser-induced damage portraits without focal area expansion connected with the focused beam refraction, comprising:

focusing laser radiation at a point placed inside a transparent material by a convex-plane lens attached to a flat face of said material parallel to an image plane;

moving said convex-plane lens along said flat face and focusing laser radiation at pre-determined points equidistant from an work article surface.

2. The method in accordance with claim 1 wherein said convex-plane lens is made from the material, which has the same refractive index value as said work article.

3. The method in accordance with claim 1 wherein liquid of the same refractive index as said lens and said article wets said flat faces of said lens and of said article providing optical contact between them.

4. The method in accordance with claim 1 wherein an article without flat faces is enclosed in a container comprising liquid optical media of the same refractive index as said lens and said article so that a flat face of said container is parallel to an image plane.

5. The method in accordance with claim 1 wherein an article without flat faces is enclosed in an additional sample made from the same material so that a flat face of said sample is parallel to an image plane.

6. A method for producing single-layer laser-induced damage portraits based on generation of small, smoothed etch points of determined sizes and on control of their brightness without variation of their determined sizes comprising the steps of:

determining sizes of etch points for production of a single layer laser-induced damage portrait;

determining the number of pixels and gray shades of a computer image necessary for its reproduction inside transparent material as a single layer laser-induced damage portrait;

determining the number of breakdowns and their configurations inside etch point areas necessary for reproduction of the right number of gray shades;

determining the damage threshold value necessary for generation of said configurations of breakdowns inside etch points of said sizes;

determining the number of expected etch points which should be irradiated for using cumulative effect;

generating and focusing a pulse laser radiation at said expected etch points so that laser energy is a shade lower than the damage threshold value;

generating, special modulating and focusing a pulse laser radiation at an area undergone provisional irradiation so that the energy distribution at a focal spot has a speckle pattern corresponding to the determined gray shade and maximal energy is rather more than the damage threshold actualized after cumulative effects.

7. The method in accordance with claim 6 wherein the original computer portrait is resampled down so that the number of its pixels is equal to 2N where $N=N_m$ if $d=d_m$ but N is equal to the integer part of $N_m\, d_m/d_1$ if $d=d_1$; $N_m$ is the minimal number of pixels necessary for enough high spatial resolution of the portrait; $d_m$ is the maximal linear dimension of etch points when a person can not see gaps by naked eye at a block of the etch points located at the distance $d_m$ from each other.

8. The method in accordance with claim 6 wherein only pixels of odd (or even) coordinates along X, Y axes determinate that material areas where etch points should be produced.

9. The method in accordance with claim 6 wherein cumulative effects is used for generating small etch points of single layer portrait without time production increment.

10. The method in accordance with claim 6 wherein the number of expected etch points, which should be irradiated for using cumulative effect is determined so as right configuration of breakdowns can be placed inside etch point area of required sizes.

11. A laser etching system producing high quality single-layer laser-induced damage portraits inside transparent material using generation of small smoothed etch points of determined sizes and dynamic control of their brightness without variation of their final required sizes comprising:

a laser for generating a main $TEM_{00}$ laser beam;

a beam splitter for splitting said main laser beam into a first laser beam and a second laser beam;

a beam expander adapted to expand said first beam;

a space structure modulator for transformation $TEM_{00}$ laser radiation into a speckle pattern of determined configurations of speckles; the number of speckles and their configuration are controlled by computer from one pulse to another;

an optical system for focusing said first beam at the point of the work article so that speckle pattern of focal plane is corresponding to beam structure behind said space structure modulator;

a convex-plane lens for contact slip of said optical system along the front flat face of said article; said lens is made from the material, which has same refractive index value as said article;

three mirrors for directing said second beam to a beam expander adapted to expand said second beam;

an optical system for focusing said second beam so that it irradiates the determined number of points following directly for that points in which breakdowns occur; in the capacity of said optical system can be also used a cylinder lens, focusing said second beam along the direction of the article movement;

a convex-plane lens for contact slip of the said optical system along the back flat face of the said article;

a phial for liquid optical media of the same refractive index as said convex-plane lenses and said article; said lens is made from the material, which has the same refractive index value as said article;

a control for moving said article;

a computer for controlling said laser, said space structure modulator and an article driver.

12. The space structure modulator in accordance with claim 11 including a batch of specific masks, which are placed one after another so that their centers consist and they can roll independently; different positional relationships of said masks give different speckle patterns behind said space structure modulator; variation of the number of speckles and variation of their configuration is controlled by a computer for every laser pulse.

* * * * *